July 6, 1965  J. A. HURRY  3,192,696
CROP-ENGAGING TINE MEANS
Filed Feb. 19, 1964
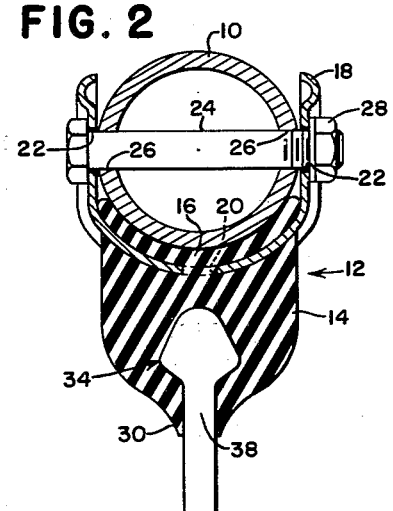
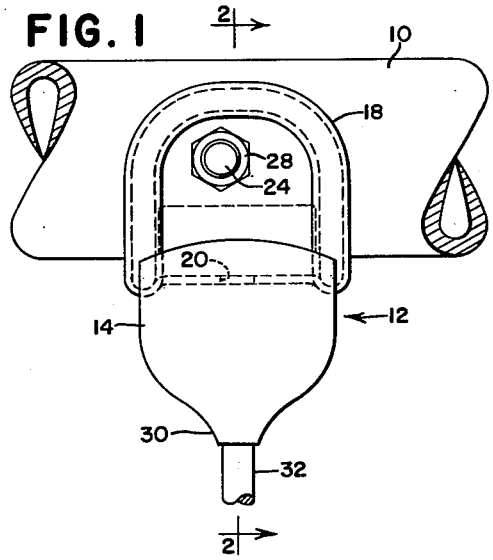
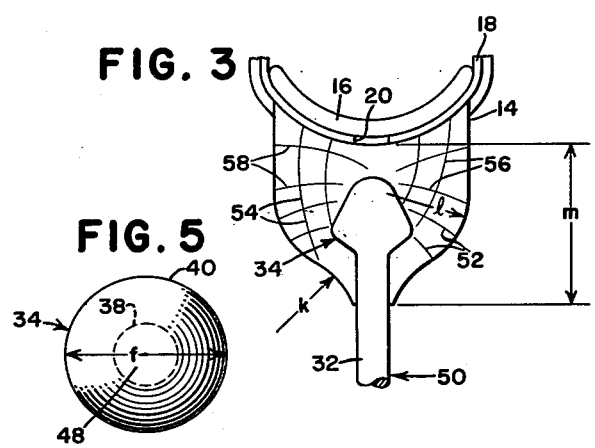
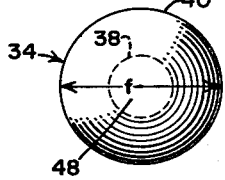
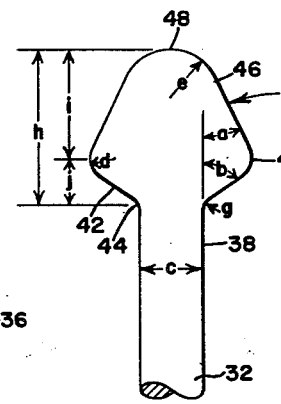
INVENTOR.
J. A. HURRY United States Patent Office 3,192,696
Patented July 6, 1965

3,192,696
CROP-ENGAGING TINE MEANS
James A. Hurry, Denver, Colo., assignor to Deere & Company, Moline, Ill., a corporation of Delaware
Filed Feb. 19, 1964, Ser. No. 345,957
8 Claims. (Cl. 56—400)

This invention relates to improvements in crop-engaging tine means, some examples of which are those used on the tooth bars, rotary wheels etc., of side delivery rakes and similar agricultural machines wherein substantial forces are encountered as the crop-engaging tine encounters the ground or other foreign object, such forces occurring in bending, primarily, but also occurring in shear and compression.

A good example of a prior art construction of the general character referred to will be found in the U.S. Patent to Gustafson 3,065,591, wherein is shown a tine mounting including a rubber block, or equivalent elastomer material, equipped at one end with an arcuate member on saddle for mounting on the bar of a side delivery rake and having embedded therein the head end of a tine or shank, the free end of which constitutes primarily the crop-engaging portion. Tine or tooth mountings of this character show marked improvement over earlier structures based largely upon obtaining resilience by extending the tine in the form of a coil spring. However, experience has shown that further improvements are capable of being accomplished in the Gustafson type of tine mounting.

According to the present invention, such improvements are achieved by the design of a novel form of head for embedding in the elastomer material, whereby to further increase the life of the mounting and block by reducing stress gradients and concentrations. This object is achieved principally by the provision on the tine of an integral head having somewhat the shape of a pear, thus eliminating the relatively sharp corners of the earlier heads and thereby avoiding stress concentrations that ultimately result in destruction of the elastomer block. It is a feature of the invention that the head has a base portion merging with the shank of the tine as an inverted cone, the major diameter of which also affords a junction with a right circular cone whose apex is blunted or rounded, thereby presenting at the two conical faces of the head relatively broad surfaces for eliminating stress concentrations as noted above. The junction of the base of the head with the shank is accomplished in the form of an annular fillet, and the junction of the two conical portions at the major diameter of the head is also smoothly rounded as the section of a torus coaxial with the head. The elimination of the stress concentrations is found to add to the life of the assembly by avoiding not only destruction of the block but destruction of the bond between the block and the head.

The foregoing and other important objects and desirable features inherent in and encompassed by the invention will become apparent as a preferred embodiment thereof is disclosed in detail in the ensuing description and accompanying sheet of drawings, the figures of which are described below.

FIG. 1 is a fragmentary elevation of the improved tine assembly mounted on a typical side delivery rake bar.

FIG. 2 is a section, taken largely along the line 2—2 of FIG. 1 but showing the full extent of the tine.

FIG. 3 is a schematic view based on FIG. 2 but eliminating the cross-hatching so as to enable the use of lines showing compressional and tensional forces incurred in the block upon the application of a bending moment to the tine.

FIG. 4 is an enlarged elevation of the head portion of the shank, utilized mainly for the purpose of illustrating representative dimensions, angles, etc.

FIG. 5 is an end view of FIG. 4.

In the drawings, the numeral 10 denotes a portion of a side delivery rake bar, which is representative of a tooth or tine support finding its equivalent in many crop-handling machines. In the present case, the bar or pipe is tubular and of cylindrical section and the tine mounting or assembly, designated generally by the numeral 12, is mounted on the bar to extend outwardly therefrom and substantially perpendicularly thereto.

The assembly 12 comprises a mounting block 14 of elastomer or equivalent material, having a first or upper end portion 16, of partially cylindrical configuration to conform to the undersurface of the bar or pipe 10. Within this portion of the block is embedded an arcuate mounting member or saddle 18, preferably perforated, as at 20, to improve the connection between the saddle and the block. Opposite sides of the saddle are formed as ears apertured at 22 to receive a mounting fastener, here a bolt 24 which is passed through the apertures 22 in the ears and through diametrically alined apertures 26 in the pipe or bar 10. A nut 28 on the bolt 24 completes the mounting of the assembly 12 to the bar 10. It will be seen that such assemblies can be readily mounted on existing rake bars, as replacements for the older coil-spring type tine mountings or as replacements for other elastomer mountings. The combination of the fastening bolt 24 and the saddle effect between the ends 16 of the block 14 and the adjoining portion of the bar further improves the connection.

The mounting block has a second or opposite end 30 from which projects, substantially as a prolongation of the block, a tooth or tine 32, the upper end of which is in the form of an enlarged pear-shaped head 34 and the opposite end of which is a terminal end 36 spaced relatively remotely from the bar 10. The tine 32 is of spring steel or other relatively rigid material other than that of the elastomer block 14. The block 14 is preferably of circular section and in a preferred embodiment has the dimensional characteristics proportional to that of the head 34 as illustrated.

In the present case, the tine 32 is shown as being substantially straight throughout its length, with the exceptions of the end portions 34 and 36. However, the material part thereof will hereinafter be referred to as a shank portion 38 which is proximate to the head 34, the head and the shank portion being coaxial on the principal axis of that portion. The shank portion is preferably of cylindrical section (FIG. 5) as is the head 34 (same figure). The major diameter of the head is substantially greater than that of the shank portion 38, the major diameter being indicated generally by the numeral 40.

The pear-shaped nature of the head is such as to give the head an annular base portion 42 in the form of an inverted frusto-conical configuration, diverging from an annular fillet junction 44 with the shank portion 38 to a junction at the major dimension 40, which is here also smoothly rounded in the form of the section of a coaxial torus, the numeral 40 serving to indicate both the junction just referred to as well as the major dimension of the head.

The head is of course integral with the shank 38 and all portions of the head are integral therewith, the whole being formed by an upsetting and shaping operation. In addition to the base portion 42, the head includes a body 46 which is in the form of a right circular cone on the axis of the shank 38, the base of this cone meeting the base of the inverted cone 42 at the annular junction 40 and the surface of the cone of course converging toward the end 16 of the block, terminating short of that end of the block in a rounded upper end 48 which is essentially the section of a smaller coaxial sphere.

A few of the basic dimensional characteristics of the head, based on a preferred embodiment, will serve to illustrate further the novel functional attributes of the head. For example, in a case in which the diameter of the shank portion 38 (dimension c) is ¼ inch, other dimensions, in inches, will be as follows: h is approximately ³⁹⁄₆₄; j is approximately ⅓ of h and i is approximately ⅔ of h, making the portion of the head above the junction 40 of greater axial length than the portion below the junction; f, the major dimension of the head is approximately ⅝; radii g, d and e are, respectively, approximately ¹⁄₁₆, ³⁄₃₂ and ³⁄₁₆; as respects FIG. 3, radii k and l are approximately ⅝ and dimension m is approximately 1¼. The diameter of the block is approximately 1½ inches.

Referring again to FIG. 4, angles a and b are, respectively, approximately 25° and 54°. As will be seen, however, these dimensions may be varied, depending upon the sizes and proportions resorted to. Those given here are based on the use of the assembly in a typical side delivery rake in which the total tooth length from the center of the bar 10 to the tip of the terminal end 36 of the shank is 9⅞ inches. The shape and dimensional characteristics further depend upon the nature of the forces and moments expected to be encountered. As pointed out, in a side delivery rake, the forces encountered by the tine 32 are mainly in bending, tending to flex the assembly about the connection of the tine via the head 34 to the block 14, in which area various types of stresses are set up. For example, and looking now at FIG. 3 and assuming that a bending force is applied to the tine 32 as indicated by and in the direction of the arrow 50, there will occur at the right-hand side of the figure a plurality of compressional stresses represented by the lines 52, whereas at the left side of the figure the compressional forces, represented by the lines 54, will be lengthwise of the block. Conversely, at the right side of the block, the tensional stresses at 56 will run lengthwise and at the left side of the block the tensional stresses will run crosswise at 58. Because of the relatively large surface supported by the head, it will be seen that the stress concentration is relatively low, being inversely proportional to the radius of curvature from the neutral or principal axis of the tine. In the prior art, the relatively sharp radii created higher stress concentrations because of the smaller radii. In the present case, the stress is distributed over a larger amount of the elastomer material. Stated otherwise, with a relatively small radius, several stress gradients occur and a stress concentration lying perpendicular to these gradients ultimately results in destruction of the block in the area of stress concentration. In the case of a head having a relatively wide upper end as distinguished from the rounded or blunt apex or "point" at 48 in the present case, substantial amounts of shear force are set up, ultimately destroying the bond between the head and the block. The wider conical surfaces established at 42 and 46 give to the stress lines 56 and 54 a much larger radius of curvature and consequently there will be fewer gradients because of the distribution of the stress over a larger amount of the elastomer material. This avoids the stress concentrations that occur in the case of several gradients of smaller radii.

Inasmuch as the structure is based on one of circular section, the same results follow regardless of the direction of the bending moment, suggested here by way of example by the arrow 50. That is to say, bending moments may occur in all directions at substantially right angles to the principal axis of the tine 32 but the benefits of the novel design are still available.

The relationship of the head to the block 14 may be adjusted to vary the stiffness or resilience of the mounting. This will depend upon the distance between the tip or point 48 of the head 34 and the saddle 18. That is to say, the greater this distance, the more flexible the assembly will be, and vice versa. Further stiffness may be afforded by elongating the head from the area of major dimension 40 to the tip or point 48. Various other alterations in dimensional characteristics will readily occur to those versed in the art, inasmuch as the present explanation points up the salient features and a representative embodiment in which the beneficial objects of the invention are accomplished.

The foregoing, as well as the attainment of other objects, will readily occur, as will many modifications and alterations in the preferred embodiment disclosed, all of which may be achieved without departure from the spirit and scope of the invention.

What is claimed is:

1. Crop-engaging tine means for mounting on the tine support of a crop-handling machine, comprising: an elastomer block having first and second portions positionable respectively proximate to and spaced from the support; and a rake tine of relatively rigid material other than the block and having a head embedded in the block and a shank rigidly joined to said head and projecting outwardly from said second block portion to a terminal crop-engaging end, said shank including a straight portion proximate to the head and within the block and said shank portion and said head being coaxial on the principal axis of said shank portion, said head and shank portion being of circular section on said axis and said head having a major diameter greater than that of said shank portion, said head having an annular junction with the shank portion and diverging thence in the direction of the first block portion to said major diameter to provide an inverted frusto-conical base and converging thence toward said first block portion as a body in the form of a right circular cone having a partially spherically rounded apex terminating short of said first end of the block.

2. The invention defined in claim 1, in which: the block is of circular section on said axis.

3. The invention defined in claim 1, in which: the junction of said head and shank portion is in the form of a smoothly rounded annular fillet.

4. The invention defined in claim 3, in which: the portion of said head of major diameter between said base and body is smoothly rounded as the section of a coaxial torus.

5. Crop-engaging tine means for mounting on the tine support of a crop-handling machine, comprising: an elastomer block having first and second portions positionable respectively proximate to and spaced from the support; and a rake tine of relatively rigid material other than the block and having a head embedded in the block and a shank rigidly joined to said head and projecting outwardly from said second block portion to a terminal crop-engaging end, said shank including a straight portion proximate to the head and within the block and said shank portion and said head being coaxial on the principal axis of said shank portion, said head and shank portion being of circular section on said axis and said head having a major diameter greater than that of said shank portion, said head having an annular junction with the shank portion and being enlarged thence to said major diameter to provide a base and converging thence toward said first block portion as a body in the form of a right circular cone having a partially spherically rounded apex terminating short of said first end of the block.

6. Crop-engaging tine means for mounting on the tine support of a crop-handling machine, comprising: an elastomer block having first and second portions positionable respectively proximate to and spaced from the support; and a rake tine of relatively rigid material other than the block and having a head embedded in the block and a shank rigidly joined to said head and projecting outwardly from said second block portion to a terminal crop-engaging end, said shank including a straight portion proximate to the head and within the block and said shank portion and said head being coaxial on the principal axis of said shank portion, said head and shank portion being of circular section on said axis and said head having a major diameter greater than that of said shank portion, said head having an annular junction with the shank portion and being enlarged thence to said major diameter and diminishing thence toward said first block portion as a body having a blunt end portion terminating short of said first end of the block, the axial distance between the major diameter and said junction being in the order of one-half that between said major diameter and said blunt end portion.

7. Crop-engaging tine means for mounting on the tine support of a crop-handling machine, comprising: an elastomer block having first and second portions positionable respectively proximate to and spaced from the support; and a rake tine of relatively rigid material other than the block and having a head embedded in the block and a shank rigidly joined to said head and projecting outwardly from said second block portion to a terminal crop-engaging end, said shank including a straight portion proximate to the head and within the block and said shank portion and said head being coaxial on the principal axis of said shank portion, said head and shank portion being of circular section on said axis and said head having a major diameter greater than that of said shank portion, said head having an annular junction with the shank portion and being enlarged thence to said major diameter to provide a base and converging thence toward said first block portion as a body in the form of a right circular cone having a blunt apex terminating short of said first end of the block.

8. Crop-engaging tine means for mounting on the tine support of a crop-handling machine, comprising: an elastomer block having first and second portions positionable respectively proximate to and spaced from the support; and a rake tine of relatively rigid material other than the block and having a generally pear-shaped head embedded in the block with its small-diameter portion toward the first end of the block and a shank rigidly joined to the large-diameter portion of said head and projecting outwardly from said second block portion to a terminal crop-engaging end.

References Cited by the Examiner
UNITED STATES PATENTS
3,096,609   7/63   Garrett et al. _____ 56—400

T. GRAHAM CRAVER, *Primary Examiner.*
RUSSELL R. KINSEY, *Examiner.*